(12) United States Patent
Lee et al.

(10) Patent No.: US 8,382,321 B2
(45) Date of Patent: *Feb. 26, 2013

(54) ILLUMINATION APPARATUS HAVING AN ADAPTER WITH A FUNCTION BLOCK SLOT

(75) Inventors: Young Hwan Lee, Seoul (KR); Kwan Soo Jang, Seoul (KR); Chung Hyun Cho, Goyang-si (KR)

(73) Assignee: Dongbu HiTek Co., Ltd. (KR)

( * ) Notice: Subject to any disclaimer, the term of this patent is extended or adjusted under 35 U.S.C. 154(b) by 379 days.

This patent is subject to a terminal disclaimer.

(21) Appl. No.: 12/615,100

(22) Filed: Nov. 9, 2009

(65) Prior Publication Data

US 2010/0117558 A1 May 13, 2010

Related U.S. Application Data

(60) Provisional application No. 61/113,535, filed on Nov. 11, 2008.

(30) Foreign Application Priority Data

Nov. 11, 2008 (KR) .......................... 10-2008-0111904
Jan. 13, 2009 (KR) .......................... 10-2009-0002526

(51) Int. Cl.
*F21S 4/00* (2006.01)
*H01R 13/66* (2006.01)

(52) U.S. Cl. ................ 362/249.02; 439/620.01

(58) Field of Classification Search ............. 315/51, 315/72, 200 R, 209 R, 246, 287, 294, 291, 315/307; 362/227, 249.01, 249.02, 249.05, 362/249.06, 249.14; 439/236, 620.01, 620.02
See application file for complete search history.

(56) References Cited

U.S. PATENT DOCUMENTS

| | | | | |
|---|---|---|---|---|
| 5,442,258 A * | 8/1995 | Shibata | ..................... | 315/129 |
| 5,759,054 A * | 6/1998 | Spadafore | ..................... | 439/236 |
| 5,924,784 A * | 7/1999 | Chliwnyj et al. | ............. | 362/234 |
| 7,932,679 B2 * | 4/2011 | Ball | ..................... | 315/247 |
| 8,035,307 B2 * | 10/2011 | Chew | ..................... | 315/200 R |
| 2004/0066142 A1 * | 4/2004 | Stimac et al. | ..................... | 315/50 |
| 2012/0139446 A1 * | 6/2012 | Koren et al. | ..................... | 315/297 |

* cited by examiner

*Primary Examiner* — Thuy Vinh Tran
(74) *Attorney, Agent, or Firm* — The Law Offices of Andrew D. Fortney; Andrew D. Fortney

(57) ABSTRACT

Embodiments provide an illumination apparatus including: an adapter that converts alternating power into driving power; and a light emitting device that is detachably and electrically connected to the adapter and that emits light according to the driving power provided from the adapter.

18 Claims, 9 Drawing Sheets ized illustrated for the con-# ILLUMINATION APPARATUS HAVING AN ADAPTER WITH A FUNCTION BLOCK SLOT The present application claims priority to Korean Patent Application No. 10-2008-0111904 (filed on Nov. 11, 2008) and No. 10-2009-0002526 (filed on Jan. 13, 2009) under 35 U.S.C. 119(a)-(d), and to U.S. Provisional Application No. 61/113,535 (filed on Nov. 11, 2008) under 35 U.S.C. 119(e), which are hereby incorporated by reference in its entirety.

BACKGROUND

Description of the Related Art

Embodiments relates to an illumination apparatus and a driving method thereof.

At the present time, a fluorescent lamp or an incandescent lamp has been widely used as an illumination apparatus. In particular, the fluorescent lamp has low power consumption and high brightness so that it has been widely used at office or at home.

Meanwhile, an illumination apparatus that replaces the fluorescent lamp or the incandescent lamp has been recently developed and, representatively, an illumination apparatus using a light emitting diode (LED) has been introduced.

However, in the case of the illumination apparatus using the LED, it is driven with different voltage from the fluorescent lamp or the incandescent lamp, causing a problem that all of power supply apparatus including conventionally installed sockets should be replaced when using the illumination apparatus using the LED.

SUMMARY OF THE INVENTION

Embodiments of the invention provide an illumination apparatus with a new structure using a LED or an OLED, and a driving method thereof.

The embodiments provide an illumination apparatus using the LED or the OLED that can be used without replacing a power supply apparatus installed for a conventional fluorescent lamp, and a driving method thereof.

The embodiments provide an illumination apparatus that can compatibly use various light emitting device illumination parts by detachably installing an adapter and a light emitting device illumination part, and a driving method thereof.

The embodiments provide an illumination apparatus that can increase the length or area of the light emitting device illumination part by disposing the adapter to be overlapped with the light emitting device illumination part, and a driving method thereof.

An illumination apparatus according to various embodiments includes: an adapter that converts alternating power (e.g., alternating current) into driving power (e.g., direct current); and a light emitting device that is detachably and electrically connected to the adapter and that emits light according to the driving power provided from the adapter.

An illumination apparatus according to other embodiments includes: an adapter that is detachably and electrically connected to an illumination apparatus socket; a power supply unit at the adapter to supply power; a light emitting device driver that at the adapter to generate driving power from the power supplied by the power supply unit; a controller that controls the light emitting device driver; and a light emitting device illumination part that includes a plurality of light emitting devices connected to the adapter to receive the driving power from the light emitting device driver and that may overlap with the adapter in a first direction and in a direction vertical to the first direction.

A method of driving an illumination apparatus according to various embodiments includes: applying alternating power from a fluorescent lamp socket; converting the alternating power into driving power in an adapter detachably and electrically connected to the fluorescent lamp socket; and providing the driving power to a light emitting device detachably and electrically connected to the adapter.

DETAILED DESCRIPTION OF THE EMBODIMENTS

Figure 1:
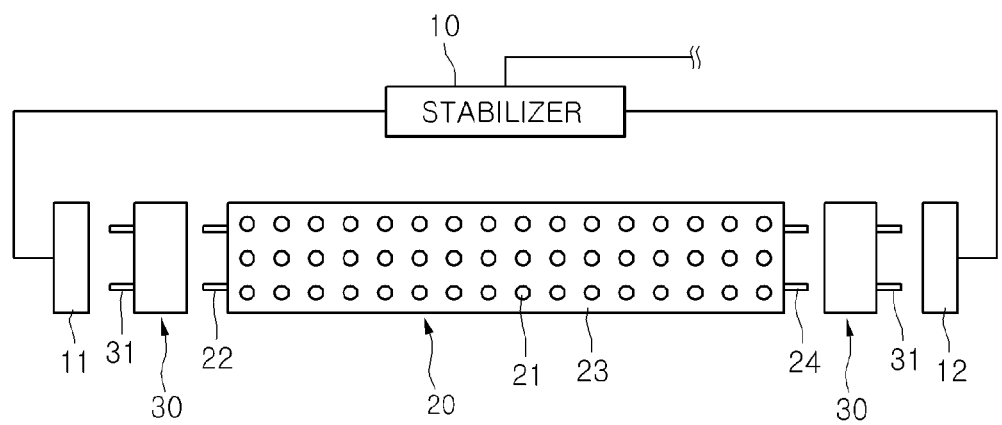
FIG. 1 is a diagram explaining an illumination apparatus according to a first embodiment.

In the drawings, the thickness or size of each layer is exaggerated, omitted or schematically illustrated for the convenience and clarity of explanation. Also, the size of each constituent does not completely reflect its actual size.

Hereinafter, an illumination apparatus according to embodiments and a driving method thereof will be described with reference to the accompanying drawings.

Figure 2:
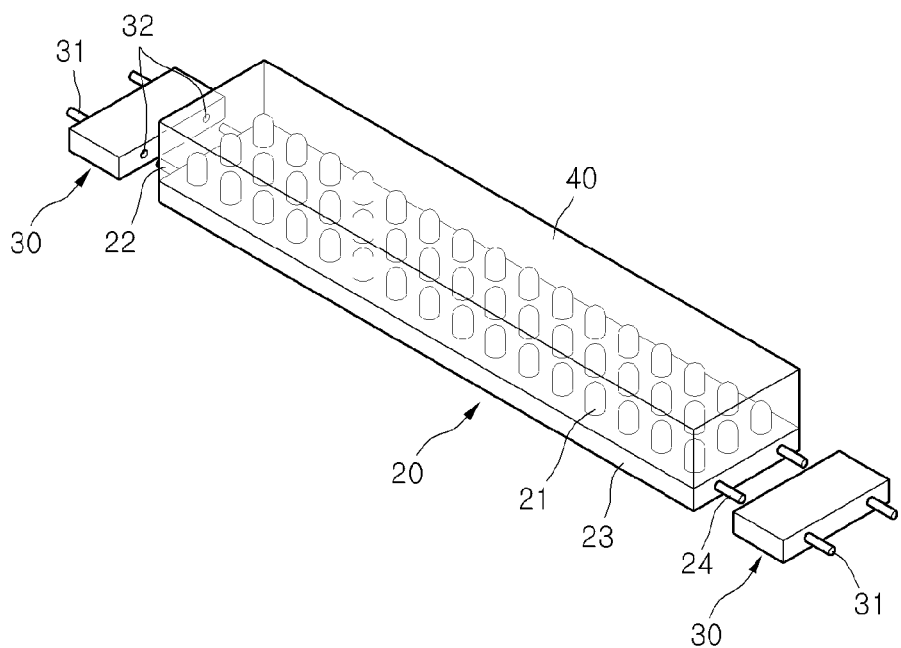
FIG. 2 is a perspective view of the illumination apparatus according to the first embodiment.
Figure 3:
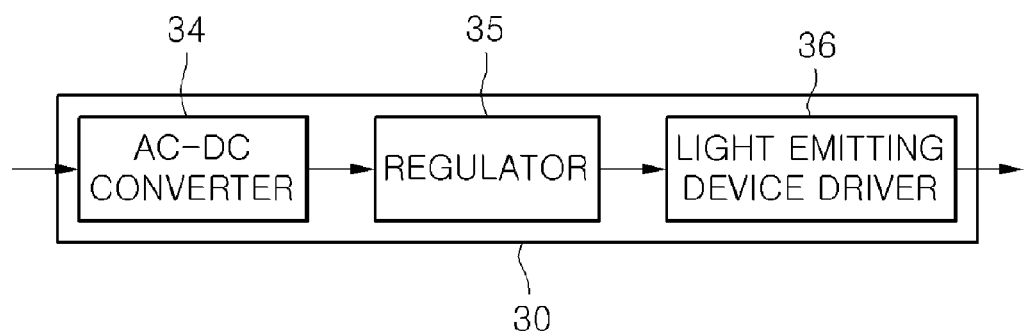
FIG. 3 is a diagram explaining an adapter in the illumination apparatus according to the first embodiment.

FIG. 1 is a diagram explaining an illumination apparatus according to the first embodiment. FIG. 2 is a perspective view of the illumination apparatus according to the first embodiment. FIG. 3 is a diagram explaining an adapter in the illumination apparatus according to the first embodiment.

First, referring to FIGS. 1 and 2, the illumination apparatus according to the first embodiment includes a light emitting device illumination part 20 having a first power terminal 22 and a second power terminal 24 at opposite ends of a substrate 23 and a plurality of light emitting devices 21 on the top surface of the substrate 23, and an adapter 30 (e.g., first and second adapters 30) coupled at sides of the light emitting device illumination part 20. Also, a cover 40 that protects the light emitting devices 21 may further be included on the substrate 23.

In the light emitting device illumination part 20, the plurality of light emitting devices 21 are arranged on the substrate 23. The light emitting devices 21 may comprise light emitting diodes (LEDs) or organic light emitting diodes (OLEDs).

The substrate 23 may be a printed circuit board (PCB) on which a circuit pattern for providing power to the light emitting devices 21 is formed. Also, the substrate 23 may be a substrate that a wiring for providing power to the light emitting devices 21 is installed on a plastic instrument.

Moreover, a reflective coating layer (not shown) may be formed on the surface of the substrate 23, making it possible to increase efficiency of light emitted from the light emitting devices 21 by coating it with silver (Ag) or aluminum (Al).

The plurality of light emitting devices 21 may include LEDs or OLEDs that emit red, blue, and green light, and may also include LEDs or OLEDs that emit white light.

The cover 40 may be formed of transparent plastic material or of plastic with various colors such as red, green, blue, etc., as needed or desired. Also, the cover 40 may be formed of translucent material and in this case, it may also provide a "soft" illumination by using a surface-roughened or coated cover 40 to scatter light more broadly.

The first and second power terminals 22 and 24 that can be electrically connected to the adapter 30 are installed at opposite ends of the substrate 23, thereby supplying power to the light emitting devices 21 from the outside.

The adapter 30 includes a connector 31 formed at one side and inserted into a first socket 11 and a second socket 12 that can be part of a conventional fluorescent lamp, and a power terminal groove (e.g., holes or socket) 32 at the opposite side and into which the first and second power terminals 22 and 24 of the light emitting device illumination part 20 are inserted.

The light emitting device illumination part 20 is coupled to the adapter 30 so that the illumination apparatus according to the first embodiment can be installed at the first and second sockets 11 and 12 where a conventional fluorescent lamp is installed. Therefore, a power supply apparatus including first and second sockets 11 and 12 of a conventional fluorescent lamp can be used for the present illumination apparatus using LEDs or OLEDs.

In particular, since the light emitting device illumination part 20 and the adapter 30 are detachably installed, when defects are generated on the light emitting device illumination part 20 or the adapter 30, only the light emitting device illumination part 20 or the adapter 30 where the defects are generated is replaced, providing low maintenance costs.

Moreover, since the light emitting device illumination part 20 and the adapter 30 are detachably installed, illumination with various atmospheres (e.g., different intensities, wavelengths, colors, etc., of light) can be provided by replacing only the light emitting device illumination part 20.

Figure 4:
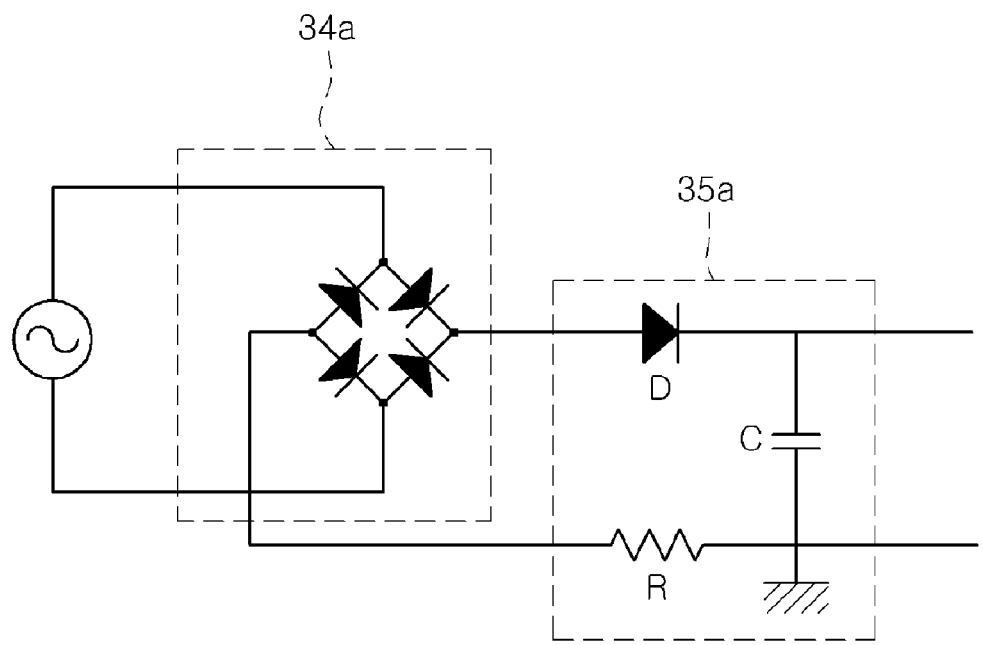
FIG. 4 is a diagram showing the AC-DC converter and the regulator of the adapter in the illumination apparatus according to the first embodiment.

Referring to FIG. 3, the adapter 30 includes an AC-DC converter 34, a regulator 35, and a light emitting device driver 36. The AC-DC converter 34 converts AC power supplied through the first and second sockets 11 and 12 into DC power, the regulator 35 allows the DC power output from the AC-DC converter 34 to be output as constant DC voltage, and the light emitting device driver 36 outputs the DC voltage supplied from the regulator 35 as driving pulse proper in driving the plurality of light emitting devices 21. For example, as shown in FIG. 4, the adapter 30 includes a bridge rectifier 34a and a smoothing circuit 35a to allow constant DC voltage to be output.

Therefore, the light emitting device illumination part 20 can also be used in the power supply apparatus for the conventional fluorescent lamp to which the AC power is supplied by the adapter 30 that includes the AC-DC converter 34, the regulator 35, and the light emitting device driver 36.

In other words, as shown in FIG. 1, the power supply apparatus for the fluorescent lamp includes a stabilizer 10 that converts commercial power into high frequency current of 20-50 kHz and first and second sockets 11 and 12 connected to the stabilizer 10, wherein only high frequency AC current is provided through the first and second sockets 11 and 12 so that the light emitting device illumination part 20 cannot be installed directly on the conventional power supply apparatus.

However, the illumination apparatus according to the first embodiment installs the adapter 30, making it possible to use the light emitting device illumination part 20, while using the conventional power supply apparatus as it is.

Moreover, since the adapter 30 and the light emitting device illumination part 20 are detachable, the illumination apparatus can be used to be connected to only the light emitting device illumination part 20 by separating the adapter 30 from the light emitting device illumination part 20 where the power supply apparatus for the light emitting device illumination part 20 is installed.

Figure 5:
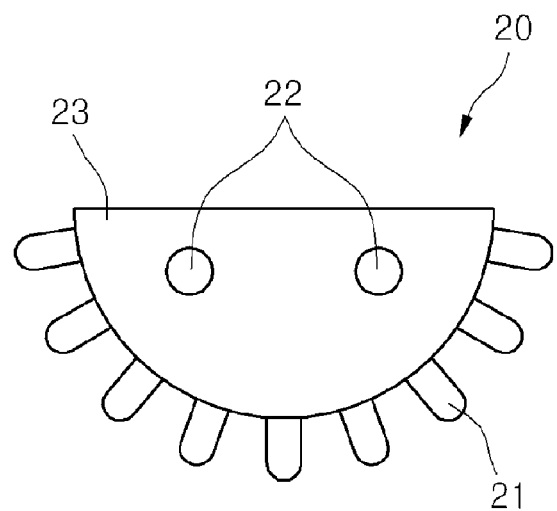
FIGS. 5 to 7 are diagrams explaining another example of the light emitting device illumination part in the illumination apparatus according to the first embodiment.
Figure 6:
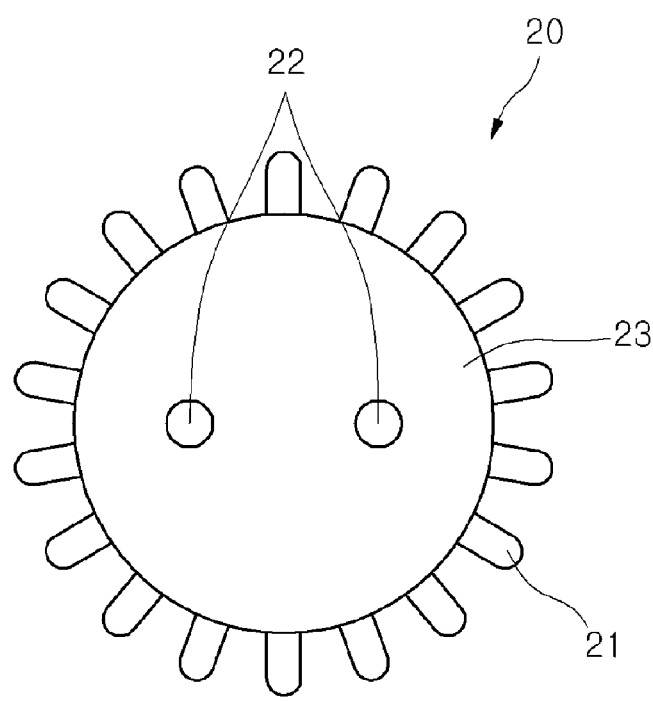
Figure 7:
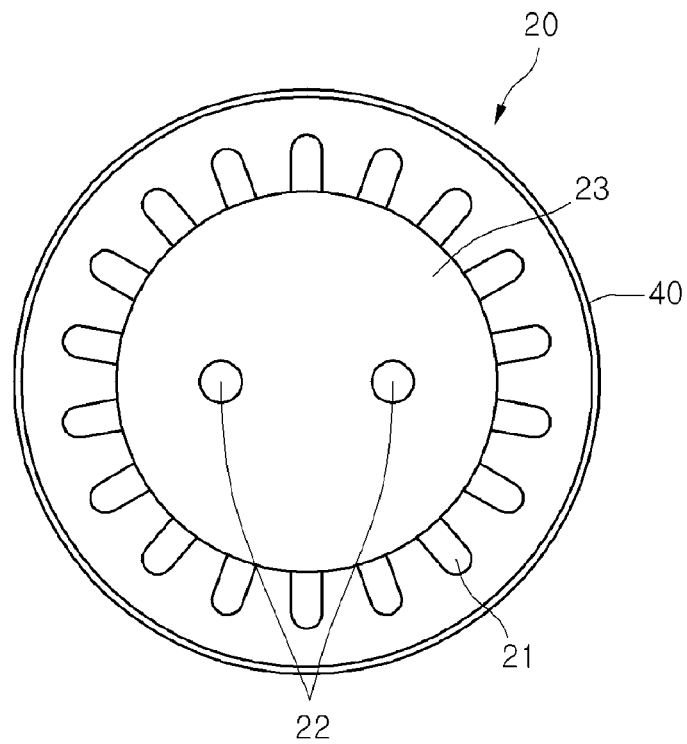

FIGS. 5 to 7 are diagrams explaining another example of the light emitting device illumination part in the illumination apparatus according to the first embodiment. FIGS. 5 to 7 are side views of the light emitting device illumination part seen from the direction where the adapter is disposed.

Referring to FIG. 5, a light emitting device illumination part 20 includes a substrate 23 whose cross-section is formed in a semicircular shape and a plurality of light emitting devices 21 installed at the semicircular surface of the substrate 23, wherein a first power terminal 22 is installed at ends of the substrate 23.

In FIG. 5, the substrate 23 has a semicircular shape and the light emitting devices 21 are installed at the curved part, such that the light emitting device illumination part 20 is proper in being used in an environment where it is effective to provide illumination only downward (e.g., away from the lamp housing). For example, when the light emitting device illumination part 20 is installed at a ceiling or the like, light efficiency can be increased.

Referring to FIG. 6, a light emitting device illumination part 20 includes a substrate 23 whose cross-section is formed in a circular shape, and a plurality of light emitting devices 21 installed at the circular surface of the substrate 23, wherein a first power terminal 22 is installed at ends of the substrate 23.

In FIG. 6, the substrate 23 is formed in a circular, cylindrical or toroidal shape, and the light emitting devices 21 are installed on the curved part such that the light emitting device illumination part 20 provides illumination in 360° directions. For example, when the light emitting device illumination part 20 is used in an advertisement facility (e.g., an illuminated of lamp-based sign) in a cylindrical shape, light efficiency can increase. The light emitting device illumination part 20 as shown in FIG. 6 may also be used as home illumination or office illumination.

Referring to FIG. 7, a light emitting device illumination part 20 includes a substrate 23 whose cross-section is formed in a circular shape and a plurality of light emitting devices 21 installed at the circular surface of the substrate 23, wherein a first power terminal 22 is installed at ends of the substrate 23. Also, a cover that protects the light emitting devices 21 is further included.

The cover 40 is spaced from the light emitting devices 21 by a predetermined interval, making it possible to protect the light emitting devices 21 from external impact or environmental change. The cover 40 may also be formed of transparent or translucent plastic material.

Figure 8:
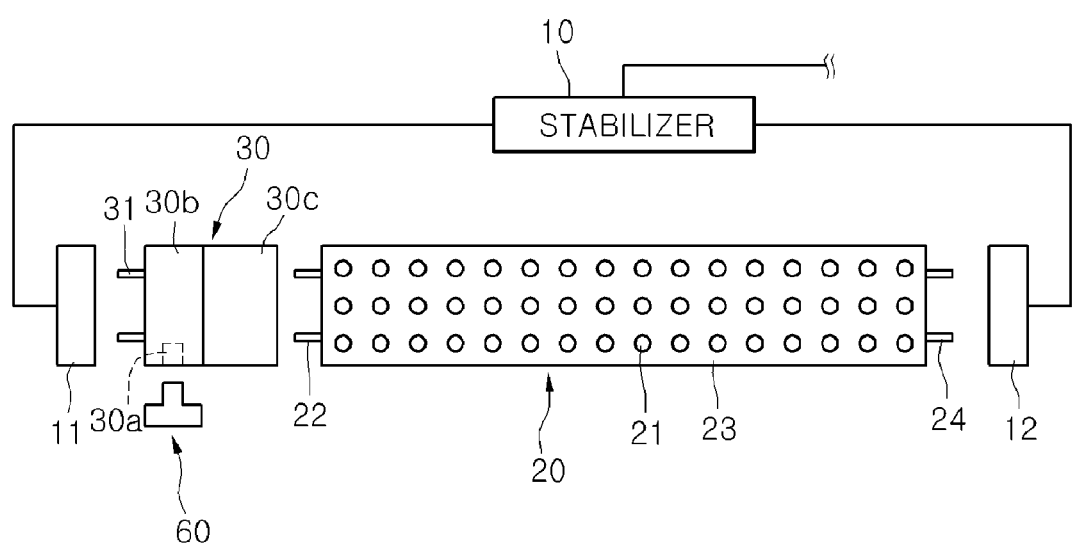
FIG. 8 is a diagram explaining an illumination apparatus according to a second embodiment.
Figure 9:
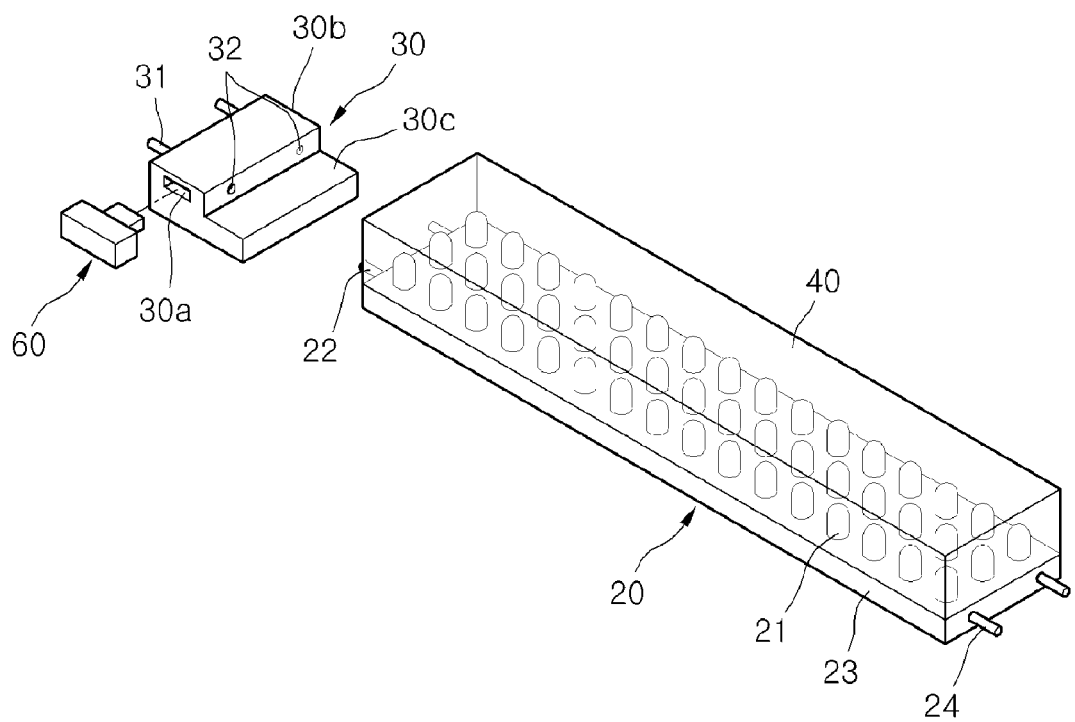
FIG. 9 is an exploded perspective view of the illumination apparatus according to the second embodiment.
Figure 10:
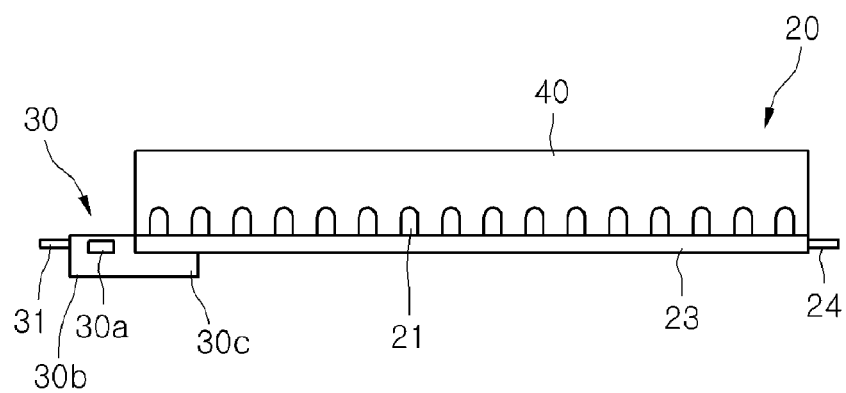
FIG. 10 is a side view of the illumination apparatus according to the second embodiment.

FIG. 8 is a diagram explaining an illumination apparatus according to a second embodiment. FIG. 9 is an exploded perspective view of the illumination apparatus according to the second embodiment. FIG. 10 is a side view of the illumination apparatus according to the second embodiment.

Referring to FIGS. 8 to 10, the illumination apparatus according to the second embodiment includes a lamp illustrated as a light emitting device illumination part 20, and an adapter 30 that drives the lamp.

In the light emitting device illumination part 20, a plurality of light emitting devices 21 are installed on a substrate 23, wherein a first power terminal 22 connected electrically to the adapter 30 is formed at one side of the substrate 23 and a second power supply 24 is formed at an opposite side of the substrate 23. Also, a cover 40 that protects the light emitting devices 21 may be installed on the substrate 23.

The adapter 30 has a power terminal groove (e.g., socket or holes) 32 formed at one side and into which the first power terminal 22 is inserted so that it can be coupled to the light emitting device illumination part 20 simultaneously with being connected electrically to the light emitting device illumination part 20. Also, a connector 31 is formed at one side of the adapter 30.

The illumination apparatus according to the second embodiment is formed to be installable by replacing the conventional fluorescent lamp bulb. In other words, the light emitting device illumination part 20 is coupled to the adapter 30 so that the illumination apparatus according to the second embodiment can be installed at first and second sockets 11 and 12 where a conventional fluorescent lamp bulb is installed. Therefore, a power supply apparatus including the first and second sockets 11 and 12 of the conventional fluorescent lamp can be used for the illumination apparatus using the LED or OLED light emitting devices 21.

At the present time, the power supply apparatus of most fluorescent lamps is provided with a first socket 11 and a second socket 12 in order to hold a fluorescent lamp bulb and provide power thereto, wherein power is provided to the first and second sockets 11 and 12 through a stabilizer 10. Therefore, the illumination apparatus according to the second embodiment allows a connector 31 formed at the adapter 30 and a second power terminal 24 formed at the light emitting device illumination part 20 to be inserted into the first and second sockets 11 and 12, thereby allowing the illumination apparatus to be coupled electrically to the first and second sockets 11 and 12 simultaneously with being supported thereby.

The power provided to the first socket 11 is provided directly to the adapter 30, and the power provided to the second socket is provided to the adapter 30 through the substrate of the light emitting device illumination part 20. And, the adapter 30 receives the power provided from the first socket 11 and the second socket 12 to drive the light emitting device illumination part 20.

In the second embodiment, the adapter 30 receives the power provided from the first socket 11 and the second socket 12 to drive the light emitting device illumination part 20, but the adapter 30 may also drive the light emitting device illumination part 20 with only the power provided from the first socket 11 of the second socket 12.

Meanwhile, in the illumination apparatus according to the second embodiment, the adapter 30 and the light emitting device illumination part 20 are overlapped in a first direction and a second direction vertical to the first direction. In other words, the adapter 30 contacts the light emitting device illumination part 20 at a side surface and a rear surface.

The adapter 30 includes a first body 30b having a first thickness and a second body 30c extended at a lower side of the first body 30b and having a second thickness thinner than the first thickness.

The first body 30b is disposed at the side surface of the light emitting device illumination part 20 and is provided with the first connector 31, the first power terminal grove 32, and the function block slot 30a. The second body 30c is disposed at the rear surface of the light emitting device illumination part 20 and is installed with internal constitutional components of the adapter 30. In other words, the second body 30c additionally provides a space on which the internal constitutional components of the adapter 30, making it possible to allow the first body 30b to be manufactured in a smaller size.

In other words, in the illumination apparatus according to the second embodiment, the adapter 30 overlaps with the light emitting device illumination part 20, making it possible to reduce the interval between the first socket 11 and the light emitting device illumination part 20 and consequently, making possible to increase the length or area of the light emitting device illumination part 20 within a limited space.

Meanwhile, the second body 30c is at the rear surface of the light emitting device illumination part 20 so that it does not affect the light efficiency emitted from the light emitting device illumination part 20.

Moreover, in the illumination apparatus according to the second embodiment, the light emitting device illumination part 20 and the adapter 30 are installed detachably so that when defects are generated in the light emitting device illumination part 20 or the adapter 30, only the light emitting device illumination part 20 or the adapter 30 where the defects are generated can be replaced, having low maintenance costs.

Moreover, in the illumination apparatus according to the second embodiment, the light emitting device illumination part 20 and the adapter 30 are detachably installed so that illuminations with various atmospheres can be provided by replacing only the light emitting device illumination part 20.

Furthermore, in the illumination apparatus according to the second embodiment, the adapter 30 can recognize the sort of the light emitting device illumination part 20 so that the adapter 30 is provided to adaptively control the light emitting device illumination part 20. Therefore, various models of the light emitting device illumination part 20 produced in various manufacturing companies can be freely selected and used.

In the light emitting device illumination part 20, a plurality of light emitting devices 21 are arranged on the substrate 23. The light emitting devices 21 may be LED or OLED.

On the substrate 23, a wiring that provides power to the light emitting devices 21 from the adapter 30 and a wiring that provides power provided from the second socket 12 to the adapter 30 may be formed. For example, the substrate 23 may be a printed circuit board (PCB).

Moreover, a reflective coating layer (not shown) may be formed on the surface of the substrate 23, making it possible to increase efficiency of light emitted from the light emitting devices 21 by coating it with silver (Ag) or aluminum (Al).

The plurality of light emitting devices 21 may include LEDs or OLEDs that emit red, blue, green, and/or white light.

The cover 40 may comprise transparent plastic material or plastic with various colors such as red, green, blue, etc., as needed or desired. Also, the cover 40 may comprise a translucent material and in this case, it may also provide an illumination with a soft atmosphere.

In addition, the adapter 30 has the function block slot 30a into which a function block 60 on which at least one or more of an infrared sensor, an image sensor, a smoke sensor, a motion sensor, and a thermal sensor can be inserted.

Figure 11:
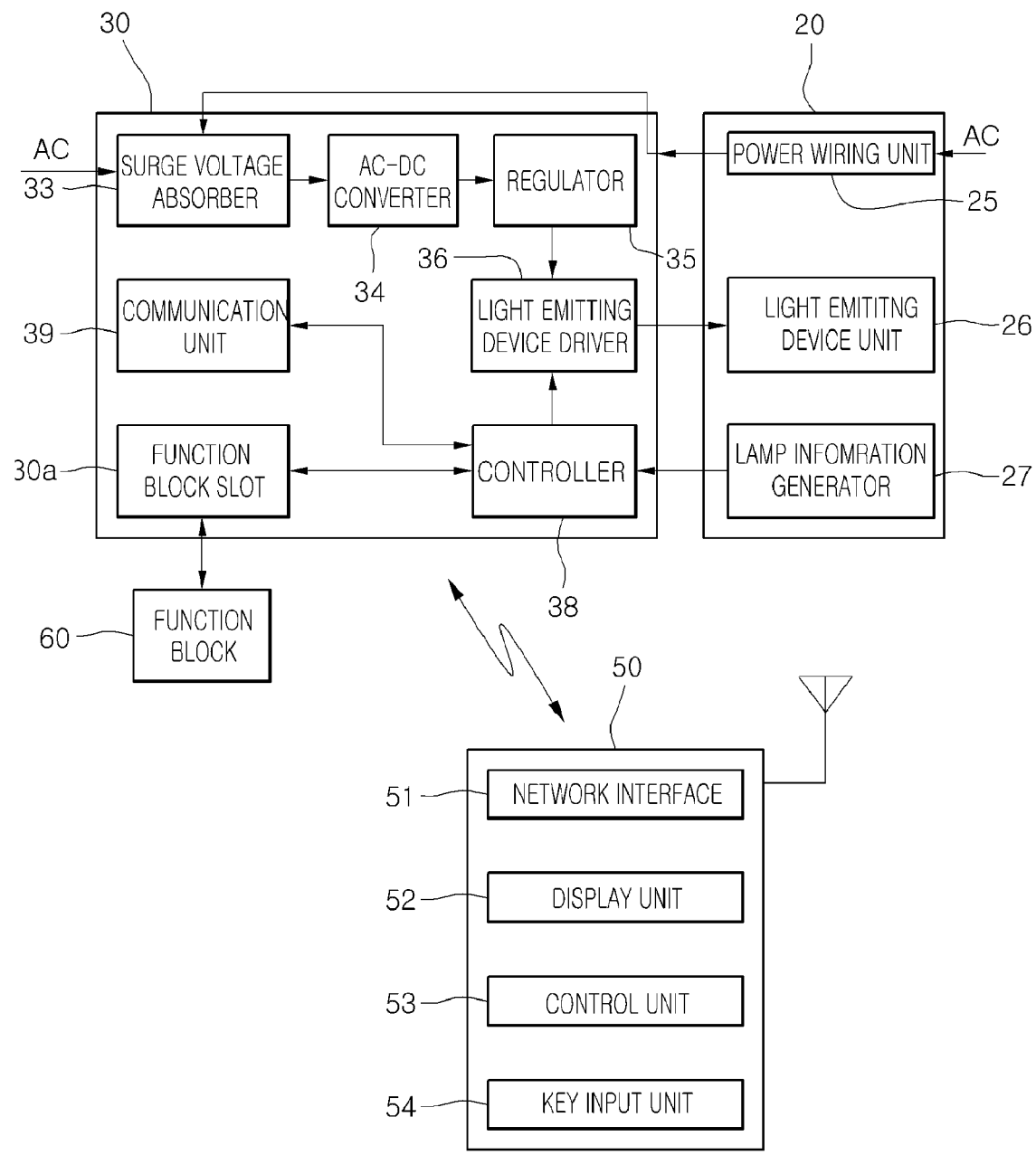
FIG. 11 is a block diagram explaining the constitution of the illumination apparatus according to the second embodiment.
Figure 12:
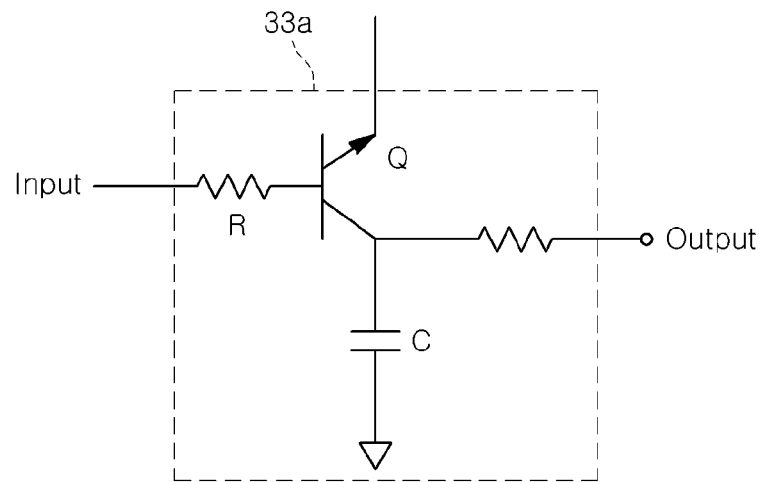
FIG. 12 is a diagram showing a surge voltage absorber in the illumination apparatus according to the second embodiment.

FIG. 11 is a block diagram explaining the constitution of the illumination apparatus according to the second embodiment, and FIG. 12 is a diagram showing a surge voltage absorber in the illumination apparatus according to the second embodiment.

Referring to FIG. 11, in the illumination apparatus according to the second embodiment, the adapter 30 may include a surge voltage absorber 33, an AC-DC converter 34, a regulator 35, a light emitting device driver 36, a controller 38, a communication unit 39, and a function block slot 30a, wherein the light emitting device illumination part 20 may include a power wiring unit 25, a light emitting device unit 26, and a lamp information generator 27.

More specifically, a function block 60 can be inserted into the function block slot 30a of the adapter 30.

The power supply unit that provides power in the adapter 30 includes the surge voltage absorber 33, the AC-DC converter 34, and the regulator 35.

The surge voltage absorber 33 is installed to absorb surge voltage when the surge voltage to turn on a fluorescent lamp is applied from a stabilizer 10, and, for example, it may include a surge voltage absorption circuit 33a as shown in FIG. 12.

The surge voltage absorber 33 receives AC power "AC" provided from the first socket 11 and AC power "AC" provided from the second socket 12 through the power wiring unit 25 of the light emitting device illumination part 20.

The AC-DC converter 34 converts the AC power supplied through the first and second sockets 11 and 12 into DC power, and the regulator 35 allows the DC power output from the AC-DC converter 34 to be output as constant DC voltage. For example, as shown in FIG. 4, the AC-DC converter 34 and the regulator 35 may include a bridge rectifier 34a and a smoothing circuit 35a.

As described above, the power supply unit of the adapter 30 receives AC power from the first socket 11 and the second socket 12 to convert it into DC power, thereby providing power.

The light emitting device driver 36 outputs the DC power supplied from the regulator 35 as driving power that is proper in driving the plurality of light emitting devices 21, that is, driving pulse.

Figure 13:
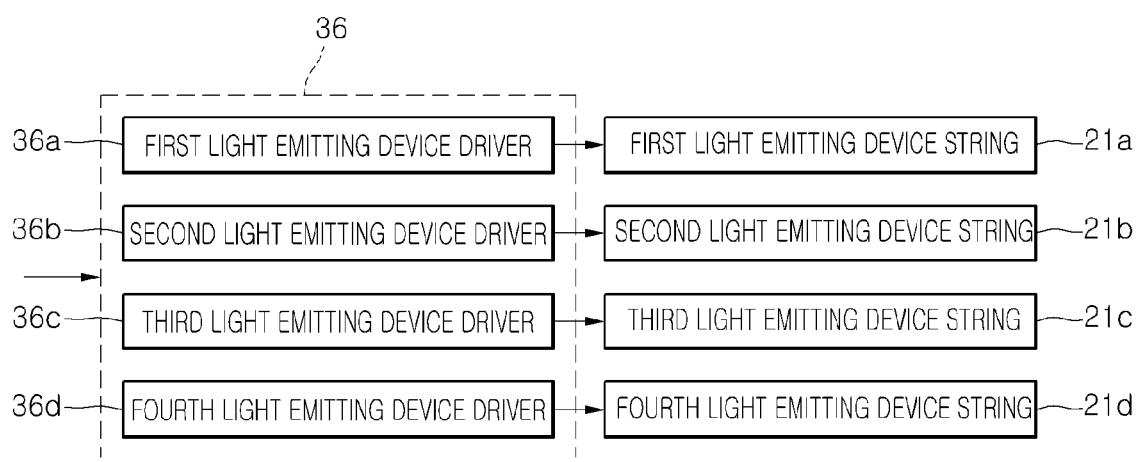
FIG. 13 is a diagram showing a light emitting device driver and a light emitting device unit in the illumination apparatus according to the second embodiment.
Figure 14:
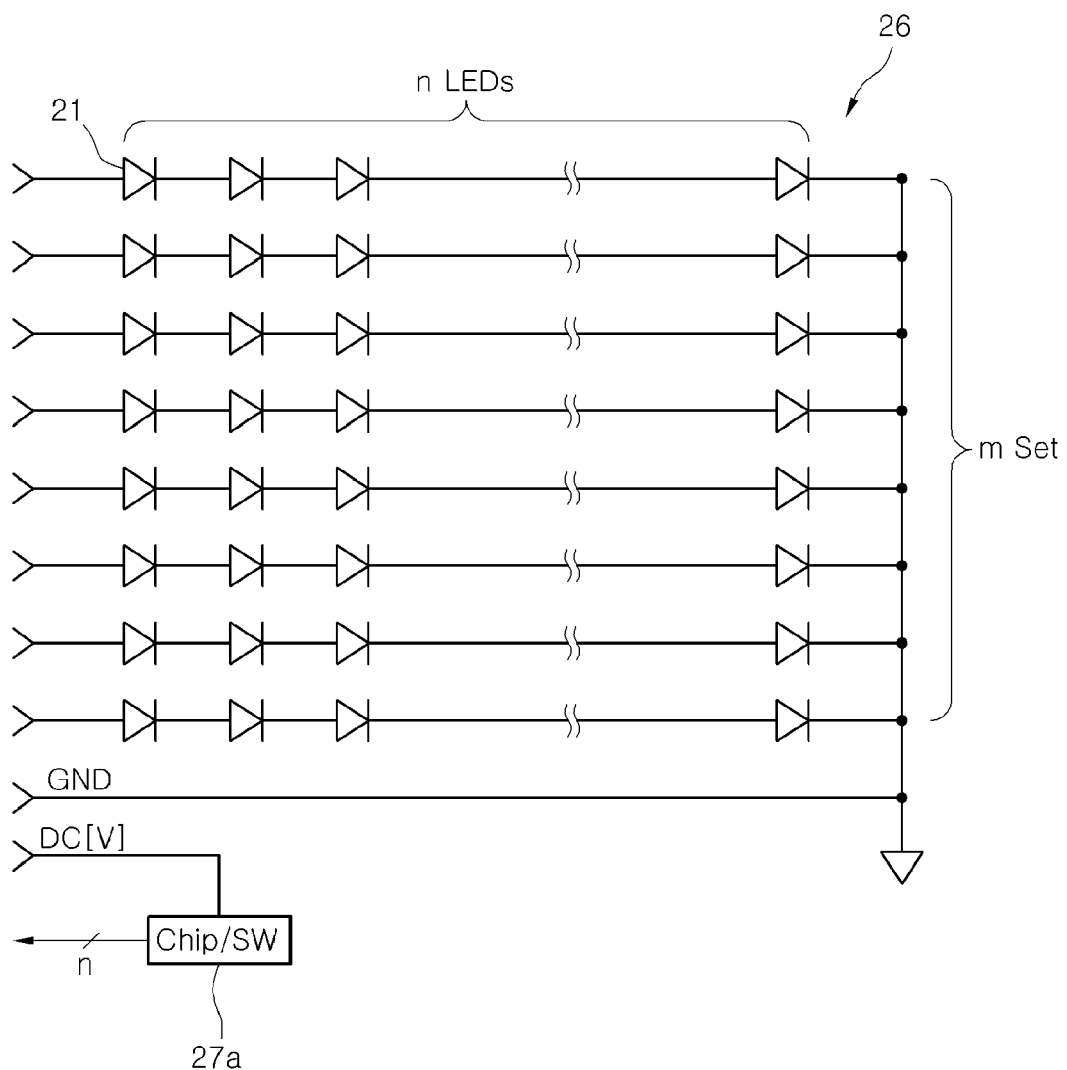
FIG. 14 is a diagram showing a light emitting device unit and a lamp information generator in the illumination apparatus according to the second embodiment.

FIG. 13 is a diagram showing a light emitting device driver and a light emitting device unit in the illumination apparatus according to the second embodiment, and FIG. 14 is a diagram showing a light emitting device unit and a lamp information generator in the illumination apparatus according to the second embodiment.

As shown in FIG. 13, the light emitting device driver 36 includes a first light emitting device driver 36a, a second light emitting device driver 36b, a third light emitting device driver 36c, and a fourth light emitting device driver 36d, wherein the first light emitting device driver 36a, the second light emitting device driver 36b, the third light emitting device driver 36c, and the fourth light emitting device driver 36d drive a first light emitting device string 21a, a second light emitting device string 21b, a third light emitting device string 21c, and a fourth light emitting device string 21d formed on the light emitting device unit 26 of the light emitting device illumination part 20, respectively.

For example, the first light emitting device string 21a may be formed by connecting a plurality of LED or OLED that emit red light in series, the second light emitting device string 21b may be formed by connecting a plurality of LED or OLED that emit green light in series, the third light emitting device string 21c may be formed by connecting a plurality of LED or OLED that emit blue light in series, and the fourth light emitting device string 21d may be formed by connecting a plurality of LED or OLED that emit white light in series.

For example, as show in FIG. 14, the plurality of light emitting devices 21 may be connected to be formed on the light emitting device unit 26, wherein as shown in FIG. 13, the plurality of light emitting devices 21 form a plurality of light emitting device strings. For example, m LED strings where n LED are connected in series are shown in FIG. 14.

The light emitting device driver 36 controls the first light emitting device driver 36a, the second light emitting device driver 36b, the third light emitting device driver 36c, and the fourth light emitting device driver 36d to control the length, interval, etc. of the driving pulses of the first light emitting device string 21a, the second light emitting device string 21b, the third light emitting device string 21c, and the fourth light emitting device string 21d, allowing various colors of light to be emitted.

For example, if the driving pulse is applied to only the first light emitting device string 21a by driving only the first light emitting device driver 36a, red light is emitted from the light emitting device illumination part 20.

Moreover, if the driving pulse is applied to only the fourth light emitting device string 21d by driving only the fourth light emitting device driver 36d, white light is emitted from the light emitting device illumination part 20. Also, if the driving pulse is applied to the first light emitting device string 21a, the second light emitting device string 21b, the third light emitting device string 21c, and the fourth light emitting device string 21d by driving the first light emitting device driver 36a, the second light emitting device driver 36b, the third light emitting device driver 36c, and the fourth light emitting device driver 36d, brighter white light is emitted from the light emitting device illumination part 20.

The controller 38 controls the first light emitting device driver 36a, the second light emitting device driver 36b, the third light emitting device driver 36c, and the fourth light emitting device driver 36d to drive the first light emitting device string 21a, the second light emitting device string 21b, the third light emitting device string 21c, and the fourth light emitting device string 21d.

For example, the controller 38 provides different driving pulse information to the first light emitting device driver 36a, the second light emitting device driver 36b, the third light emitting device driver 36c, and the fourth light emitting device driver 36d, making it possible to control the color, brightness, chroma, blinking, etc. of light emitted from the plurality of light emitting devices 21.

Meanwhile, the lamp information generator 27 is formed on the light emitting device illumination part 20.

The lamp information generator 27 provides lamp information on the light emitting device illumination part 20 to the controller 38 of the adapter 30. The lamp information generator 27 can provide lamp information to the controller 38 using an electrical/mechanical method, and, for example, a chip 27a provided with software SW including the lamp information on the light emitting device illumination part 20 is shown in FIG. 14.

The lamp information on the light emitting device illumination part 20 may include, for example, at least any one of information on the size of the substrate 23, information on the sort and the number of the light emitting devices 21 installed on the substrate 23, information on the brightness and the color of light emitted from the light emitting device illumination part 20, and information on the power including voltage and current proper in driving the light emitting device illumination part 20.

When the lamp information generator 27 is provided in the chip 27a shape as shown in FIG. 14, the lamp information generator 27 receives voltage DC from the adapter 30 to provide the lamp information to the controller 38 of the adapter 30.

The controller 38 receives the lamp information, making it possible to adaptively drive the light emitting device illumination part 20 according to the lamp information. For example, the controller 38 can allow proper voltage and current to be provided to the light emitting device illumination part 20 according to the power information of the lamp information.

Moreover, for example, the controller 38 can provide a proper driving signal so that desire brightness and color can be emitted from the light emitting device illumination part 20 according to the information on the brightness and color of the light emitted from the light emitting device illumination part 20.

The communication 39 performs communication with the remote controller 50 and the controller 38 may also be remotely controlled by the remote controller 50. The communication unit 39 and the remote controller 50 can perform communication in a wireless communication method, for example, according to the Zigbee standard.

The remote controller 50 includes a network interface 51 that transmits data to the communication unit 39, a key input unit 54 into which a user operation command is input, a display unit 52 that displays a user operation state, and a control unit 53 that controls the network interface 51 and the display unit 52 according to the signal of the key input unit 54.

Therefore, as the user transmits the control command to the communication unit 39 using the remote controller 50, the communication unit 39 transmits the user control command to the controller 38, making it possible to control the light emitting device illumination part 20.

For example, the user can control the light emitting device illumination part 20 to emit a specific color of light using the remote controller 50, and the controller 38 can control the first light emitting device driver 36a, the second light emitting device driver 36b, the third light emitting device driver 36c, and the fourth light emitting device driver 36d to be selectively driven according to the signal input from the communication unit 39.

Moreover, the user can allow the light emitting device illumination part 20 to be turned on or turned off after a predetermined time elapses, using the remote controller 50. In other words, by inputting a timer function, the user can allow the controller 38 to control the light emitting device driver 36 according to the change of time.

The function block 60 is coupled detachably to the function block slot 30a of the adapter 30, making it possible to be connected to the controller 38.

Figure 15:
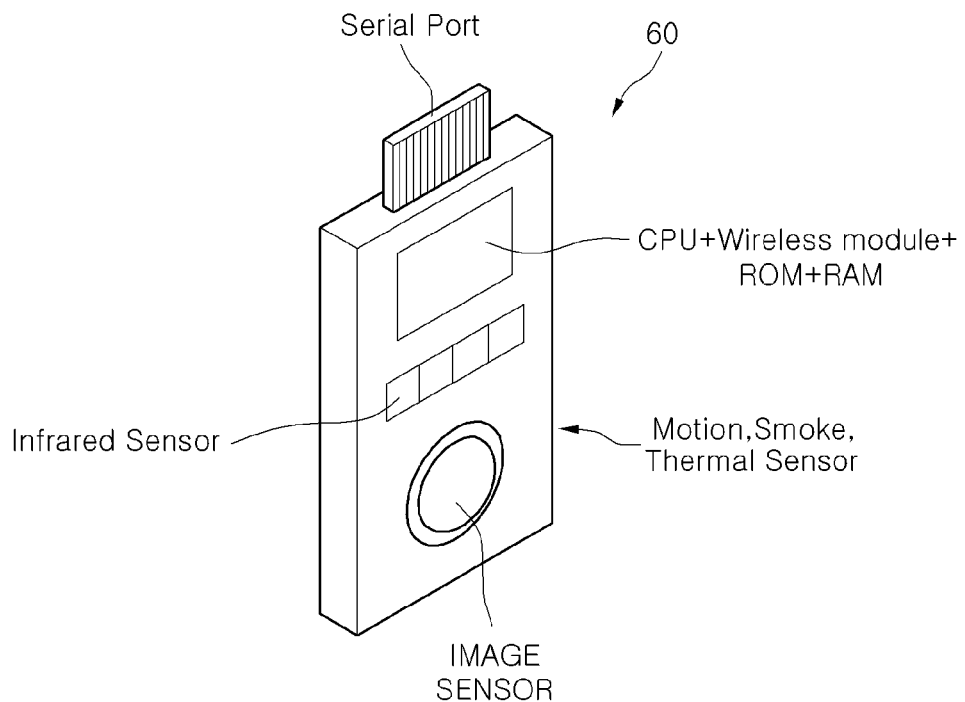
FIG. 15 is a diagram showing a function block in the illumination apparatus according to the second embodiment.

FIG. 15 is a diagram showing a function block in the illumination apparatus according to the second embodiment.

Referring to FIG. 15, the function block 60 is formed with a serial port that can be inserted into the function block slot 30a, wherein, for example, the serial port may be a USB connector. The interface and communication methods between the function block slot 30a and the function block 60 may be diversely selected.

And, the function block 60 is formed with at least one of an infrared sensor, an image sensor, a smoke sensor, a motion sensor, and a thermal sensor, making it possible to perform any one of an intruder sensing function, a monitoring camera function, and a fire sensing function.

For example, the infrared sensor, the motion sensor, and the thermal sensor can be used for performing the intruder sensing function, the smoke sensor and the thermal sensor can be used for performing the fire sensing function, and the image sensor can be used for performing the monitoring camera function.

With the illumination apparatus according to the second embodiment, when performing the intruder sensing function, if the function block 60 senses the motion of a human through the infrared sensor, the thermal sensor, and the motion sensor, while the intruder sensing function of the function block 60 is operated, it transmits the sensing signal to the controller 38 and the controller 38 outputs an intrusion alarm through a speaker.

And, the controller 38 can control the image sensor to photograph an image and can transmit the sensed information to the remote controller 50 through the communication unit 39. At this time, the function block 60 can transmit the image obtained through the image sensor to the controller 38, and the controller 38 can transmit the image to the remote controller 50 through the communication unit 39.

With the illumination apparatus according to the second embodiment, when performing the fire sensing function, if the function block 60 senses fire through the thermal sensor or the smoke sensor, while the fire sensing function of the function block 60 is operated, it transmits the sensing signal to the controller 38 and the controller 38 outputs an fire alarm through a speaker.

And, the controller 38 can transmit the sensed information to the remote controller 50 through the communication unit 39.

With the illumination apparatus according to the second embodiment, when performing the monitoring camera function, the function block 60 periodically photographs an image through the image sensor, while the monitoring camera function of the function block 60 is operated. When an intruder is sensed as described above, the function block 60 can photograph an image in shorter periods.

The user can, of course, perform various controls including the turn-on/turn-off of the operation of the function block 60 through the remote controller 50.

Moreover, the function block 60 may also include CPU for control, wireless module for communication, and ROM and RAM for programming and memory.

Figure 16:
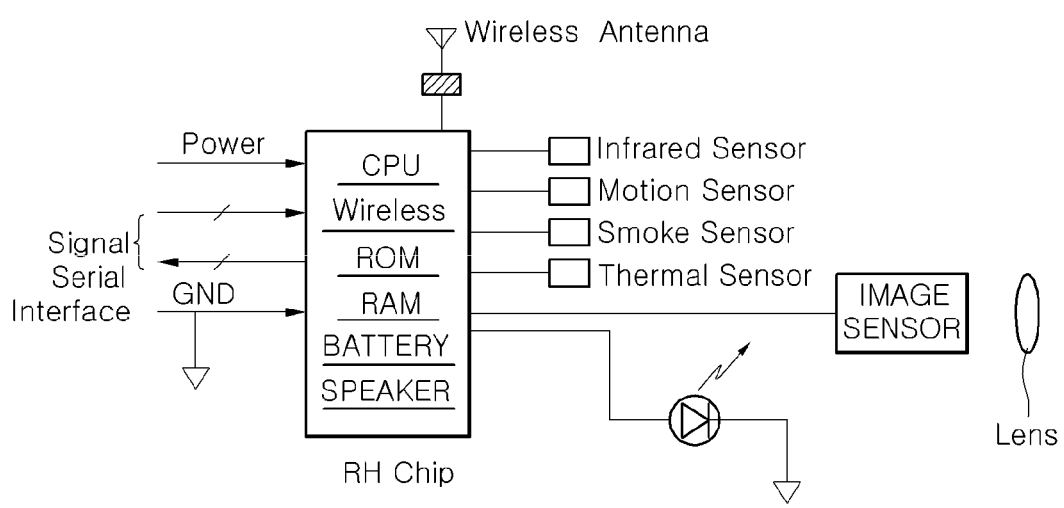
FIG. 16 is a diagram showing a functional viewpoint of the function block in the illumination apparatus according to the second embodiment.

FIG. 16 is a diagram showing a functional viewpoint of the function block in the illumination apparatus according to the second embodiment.

In the illumination apparatus according to the second embodiment, constituents provided in the adapter 30 may be provided in the function block 60. For example, the light emitting device driver 36, the controller 38, and the communication unit 39 provided in the adapter 30 may be provided in the function block 60 other than the adapter 30 and may also be provided in both the adapter 30 and the function block 60.

The function block 60 receives power from the adapter 30 and transmits/receives the signal through a serial interface such as the serial port. Also, the function block 60 may be provided with CPU, ROM, RAM, etc. and may also be provided with wireless module. Also, the function block 60 may be provided with a battery and may be installed with a speaker.

As described above, the illumination apparatus according to the second embodiment disposes the adapter 30 to be overlapped with the light emitting device illumination part 20, making it possible to further increase the length or area of the light emitting device illumination part 20.

Moreover, the illumination apparatus according to the second embodiment can also be used in the power supply apparatus for the conventional fluorescent lamp to which AC power is provided, by the adapter 30 including the surge voltage absorber 33, the AC-DC converter 34, the regulator 35, and the light emitting device driver 36.

In other words, as shown in FIG. 8, the power supply apparatus for the fluorescent lamp includes a stabilizer 10 that converts commercial power into high frequency current of 20-50 kHz and two first and second sockets 11 and 12 connected to the stabilizer 10, wherein only high frequency AC current is provided through the first and second sockets 11 and 12 so that the light emitting device illumination part 20 cannot be installed directly on the conventional power supply apparatus. However, the illumination apparatus according to the second embodiment installs the adapter 30, making it possible to use the light emitting device illumination part 20, while using the conventional power supply apparatus as it is.

Moreover, the illumination apparatus according to the second embodiment can obtain the lamp information of the light emitting device illumination part 20 from the adapter 30, making it possible to adaptively control the light emitting device illumination part 20 according to the characteristics of the light emitting device illumination part 20 coupled to the adapter 30.

Furthermore, the illumination apparatus according to the second embodiment can be controlled remotely by the adapter 30 including the communication unit 39 that performs communication with the remote controller 50.

In addition, the illumination apparatus according to the second embodiment has the function block slot 30a and the function block 60 that is detachable to the function block slot 30a, making it possible to perform the intruder sensing function, the monitoring camera function, and the fire sensing function together with the illumination function.

Various embodiments can provide the illumination apparatus with a new structure using LEDs or OLEDs, and the driving method thereof.

The embodiments can provide the illumination apparatus using the LED or the OLED that can be used without replacing the conventional power supply apparatus installed for the fluorescent lamp, and the driving method thereof.

The embodiments can provide the illumination apparatus that can compatibly use various light emitting device illumination parts by detachably installing the adapter and the light emitting device illumination part, and the driving method thereof.

The embodiments can provide the illumination apparatus that can increase the length or area of the light emitting device illumination part by disposing the adapter to be overlapped with the light emitting device illumination part, and the driving method thereof.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An illumination apparatus comprising:
    an adapter that converts alternating power into driving power;
    a function block slot in or on the adapter, wherein the function block slot includes a serial port and is configured to detachably couple a function block to the function block slot; and
    a light emitting device that is detachably and electrically connected to the adapter and that emits light according to the driving power from the adapter.

2. The illumination apparatus according to claim 1, wherein the adapter converts AC power into DC power.

3. The illumination apparatus according to claim 1, wherein the adapter includes:
    an AC-DC converter that converts an alternating current (AC) into a DC voltage;
    a regulator that allows the DC voltage output from the AC-DC converter to be output as constant DC voltage; and
    a light emitting device driver that outputs the constant DC voltage from the regulator as one or more driving pulses.

4. The illumination apparatus according to claim 1, wherein the adapter includes:
    a connector adapted to be inserted into a standard fluorescent lamp socket; and
    a power terminal hole or socket into which a power terminal of the light emitting device is coupled.

5. The illumination apparatus according to claim 1, wherein the light emitting device includes:
    a substrate;
    a plurality of light emitting diodes on the substrate; and
    first and second power terminals at first and second ends of the substrate to be coupled to the adapter.

6. The illumination apparatus according to claim 5, further comprising a cover over the light emitting diodes, configured to protect the plurality of light emitting devices.

7. The illumination apparatus according to claim 5, wherein the substrate has a semicircular cross-section, and the plurality of light emitting diodes are on or along the curved surface of the substrate.

8. The illumination apparatus according to claim 5, wherein the substrate has a circular cross-section, and the plurality of light emitting diodes are on or along the curved surface of the substrate.

9. The illumination apparatus according to claim 8, further comprising a cover over the plurality of light emitting diodes, the cover having a cylindrical shape.

10. The illumination apparatus according to claim 5, wherein the light emitting diodes comprise LEDs or OLEDs.

11. An illumination apparatus comprising:
- an adapter that is detachably and electrically connected to an illumination apparatus socket;
- a power supply unit in the adapter to supply power;
- a light emitting device driver in the adapter to generate driving power with the power supplied from the power supply unit;
- a controller that controls the light emitting device driver;
- a communication unit connected to the controller, configured to communicate with a remote controller;
- a function block slot in or on the adapter, wherein the function block slot includes a serial port;
- a function block configured to be detachably coupled to the function block slot; and
- a light emitting device illumination part that includes a plurality of light emitting devices connected to the adapter to receive the driving power from the light emitting device driver.

12. The illumination apparatus according to claim 11, wherein the adapter contacts the light emitting device illumination part at one or more side surfaces.

13. The illumination apparatus according to claim 11, wherein a portion of the adapter is at a rear surface of the light emitting device illumination part.

14. The illumination apparatus according to claim 11, wherein the light emitting device illumination part includes a substrate on or over which the plurality of light emitting devices are installed, and a portion of the adapter is at a rear surface of the substrate.

15. The illumination apparatus according to claim 11, wherein the adapter and the light emitting device illumination part are detachably coupled.

16. The illumination apparatus according to claim 11, wherein the light emitting devices comprise LEDs or OLEDs.

17. The illumination apparatus according to claim 11, wherein the communication unit is connected to the adapter.

18. The illumination apparatus according to claim 11, wherein the communication unit is installed at the function block.

* * * * *